Figure 1:
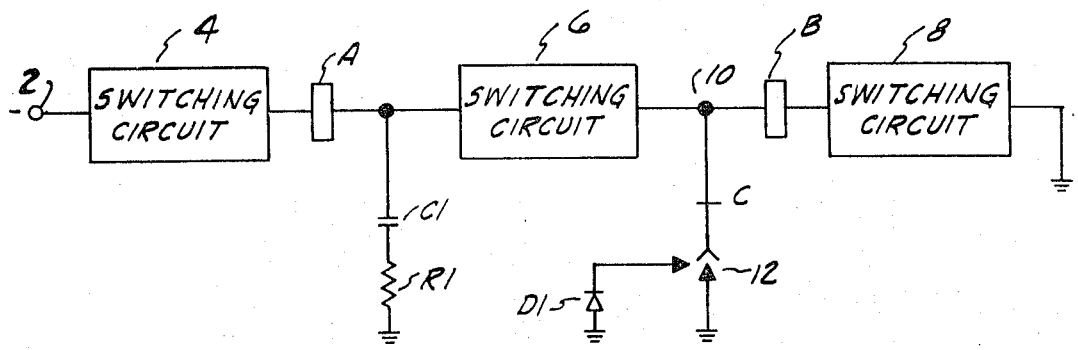

United States Patent
Malm

[15] 3,666,997
[45] May 30, 1972

[54] CIRCUIT FOR SPEEDING THE OPERATION OF A RELAY

[72] Inventor: Marvin Forrest Malm, Milan, Tenn.

[73] Assignee: International Telephone and Telegraph Corporation, New York, N.Y.

[22] Filed: Oct. 30, 1970

[21] Appl. No.: 85,519

[52] U.S. Cl. .................... 317/123, 179/186 E, 317/DIG. 6
[51] Int. Cl. .................................................... H01h 47/22
[58] Field of Search ............... 307/143; 317/DIG. 6, 123; 179/186 E

[56] References Cited

UNITED STATES PATENTS 2,951,186  8/1960  Dickinson .................... 317/DIG. 6
3,149,244  9/1964  Barnes et al. .................... 317/DIG. 6

Primary Examiner—Robert K. Schaefer
Assistant Examiner—William J. Smith
Attorney—C. Cornell Remsen, Jr., Walter J. Baum, Paul W. Hemminger, Charles L. Johnson, Jr., James B. Raden, Delbert P. Warner and Marvin M. Chaban

[57] ABSTRACT

The operation of a relay is speeded up by placing its windings in series with the energized windings of a second relay. Collapse of the magnetic field in the windings of the second relay produces an EMF which is greater than that normally available for the operation of the first relay thereby causing the first relay to be energized with a higher potential, and to operate more quickly.

6 Claims, 2 Drawing Figures

Patented May 30, 1972  3,666,997

INVENTOR.
MARVIN F. MALM
BY
Delbert O. Warner

CIRCUIT FOR SPEEDING THE OPERATION OF A RELAY

This invention relates to a circuit for increasing the speed at which a relay may be operated.

In the prior art, to increase the speed at which a relay operates, use is sometimes made of a capacitor which is charged to a higher voltage than the voltage normally required for operation of the relay. The charged capacitor is then discharged through the relay, causing a more rapid build-up of the magnetic field in the relay windings than would otherwise occur and thereby reducing the time required for operation of the relay.

Usage of a capacitor to speed-up the operation of a relay in this manner has several disadvantages in a switching system. These disadvantages include requirements for additional equipment, such as a special high voltage supply, a capacitor which is an extra component, and a more complicated switching arrangement.

It is a primary object of the present invention to overcome the foregoing disadvantages while assuring faster operation of a relay and circuits dependent upon operation of the relay.

In order to attain the foregoing objects and overcome the objectionable features of the prior art, the present invention employs energy stored in one relay coil, or inductor, to overcome the normal inductive opposition to build-up of energy in a coil or inductor of a second relay. This procedure greatly reduces the build-up time required for the magnetic field, thereby causing the second relay to operate faster.

Figure 2:
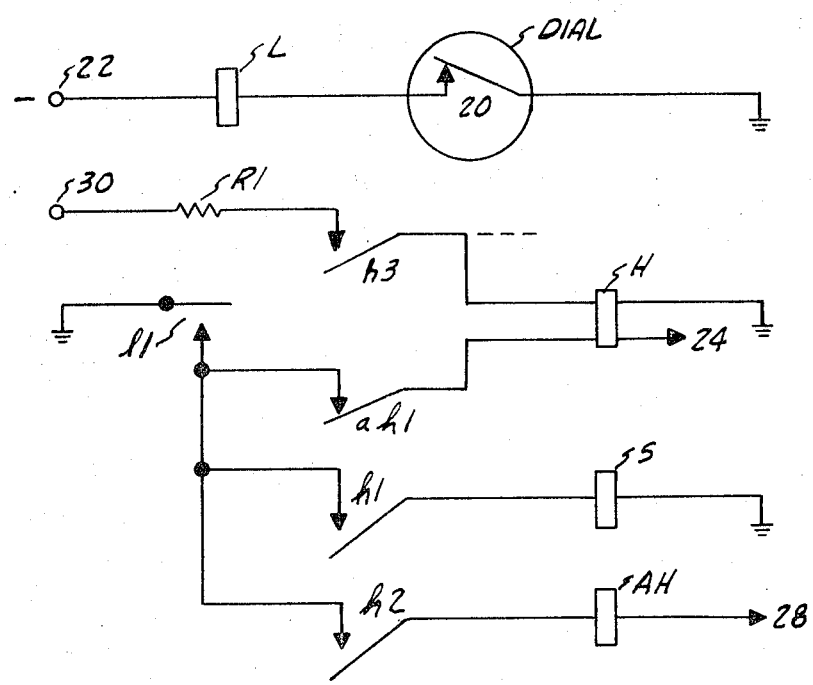

The above mentioned and other features and objects of this invention and the manner of obtaining them will become more apparent, and the invention itself will be best understood by reference to the following description of an embodiment of the invention taken in conjunction with the accompanying drawings, in which:

FIG. 1 illustrates an embodiment of the invention in a simplified form to show the principles employed, and FIG. 2 illustrates an embodiment of the invention as it may be applied in a particular circuit.

Turn now to FIG. 1 for a disclosure of the principles of the invention as they apply to a preferred embodiment of the invention. In this Figure, a relay A and a relay B are shown to be interconnectable between a terminal 2 and ground through a number of switching circuits indicated by blocks at 4, 6 and 8. It should be noted that in using the invention with telephone circuits and the like there will be complete connections through appropriate switching elements (not shown) in blocks 4, 6 and 8. Continuity between parts of the line is indicated by dashed lines within the blocks 4, 6 and 8.

In discussing the invention as embodied in FIG. 1, let us assume a case in which connections are completed by telephone switching circuits at 4 and 6 using conventional means outside the scope of the present invention. Under these circumstances, relay A will be operated by the application of a negative voltage from the terminal 2 via circuits 4 and 6 and the break contact c to ground. In the operated state, the windings of relay A serve as energy storage inductors.

Assume further that by normal means (not shown) ground is connected through the switching elements at 8 and through the coil at B to the terminal 10. Subsequently, the contact c is opened. Current from terminal 2 will then be diverted to flow from terminal 10 through the coil in relay B and the switching circuit 8 to ground. At this time, however, the inductive reactance presented by the coil of relay B will oppose the flow of current. This causes the flow of current to be limited and the magnetic field in the winding of A to begin to collapse. In collapsing, the magnetic field in the winding of A generates a counter EMF which increases the voltage at 10 and, therefore, the voltage appearing across the winding of relay B. This higher voltage tends to offset the effects of the inductive reactance in the winding of B, forcing the magnetic field in B to build up much more rapidly than it otherwise would and sharply reducing the time lag caused by inductive reactance in the winding of the relay B.

In the circuit of FIG. 1, RC suppression is provided by R1 and C1 in the event the inductive kick voltage reaches breakdown levels of the insulation of any components involved. Selected R1 and C1 components have an insignificant effect on timing. If relay B is to release in the normal time, a diode D1 will be connected between point 12 and ground. Alternatively, with a ground connection directly to terminal 12, the relay B will be slow to release.

Turn now to FIG. 2 for an illustration of a portion of a register circuit employing the principles set forth above in relation to FIG. 1. In FIG. 2, a line relay L is shown. This relay may be used in dial pulsing through opening and closing contacts 20 in a conventional manner. A hold relay H is used in the completion and maintenance of certain circuits of the register in a normal way. Similarly, the relay S performs usual functions in a dial system.

The speed of operation of the S relay is increased through use of the principles of this invention. As a result, the operation of the register is improved. To accomplish this improvement, the following sequence of events is followed using components such as are shown in FIG. 2. On seizure, occasioned by application of a potential at terminal 22, the L relay operates closing make contact $l1$ and causing the H relay to be operated by a potential directed between terminal 24 and ground. Relay H, in operating, closes make contacts $h1$, $h2$ and $h3$ and locks itself between a potential at 30 over R1 and make contact $h3$ to ground. At this time, the ground potential available through contact $l1$ is extended through the contacts $h1$ and $h2$. The potential at both sides of the S relay coil is at ground, thus making relay S inoperative. At the same time, the relay AH is operated by the potential over its winding between terminal 28 and ground. Operation of relay AH causes certain functions to be performed through closure of contacts which are not shown in addition to opening the operate path of relay H. Upon being operated, energy is stored in the magnetic circuit of relay AH.

When a digit is dialed and the L relay drops at the start of the first pulse, the contact $l1$ are opened and the short is removed from the S relay, allowing it to operate via the AH winding to the potential at point 28. The operation of the S relay is speeded up due to the energy from the field of the relay AH. The inductance in the coil of the S relay opposes a change in current which normally causes a lag in field build-up and a corresponding lag in relay operation. However, using the illustrated circuit in accordance with the invention, the AH relay also exhibits opposition to change due to the inductance of its coil. As the field in the AH relay collapses it generates a voltage which causes a rapid build-up in the S relay field thereby reducing the field build-up time to a low level. As a consequence, the operate time of the S relay is reduced about 40%.

By use of this invention in the register circuit referred to above, two power resistors can be eliminated from the register circuit. At the same time the performance of the S relay, and consequently of the register, is improved without adding other expensive components.

The principles of this invention may be used in selected circuits when a relay must operate faster than normal. The invention does not require the use of a high voltage supply or extra components.

While the principles of the invention have been described above in connection with specific apparatus and applications, it is to be understood that this description is made only by way of example and not as a limitation on the scope of the invention.

I claim:

1. A circuit for increasing the speed of operation of a relay, comprising
   first and second relays, and
   switching means including a plurality of relay contacts for coupling windings of said first relay in series between a source of potential and a terminal and through the terminal to a first ground connection to produce a magnetic field in said windings of the first relay, said switching means including contacts for coupling the second relay in series between the terminal and a second ground connection, said switching means including contacts for decoupling the first relay and the terminal from the first ground connection to enable the magnetic field in the first relay to begin to collapse, thereby generating a potential augmenting the potential from the source of potential to speed the energization of the second relay.

2. A circuit as claimed in claim 1, in which
the switching means for coupling the first relay between a source of potential and a first ground connection includes a line relay responsive to seize signals to provide the initial coupling over make contacts.

3. A circuit as claimed in claim 1, in which
the switching means for coupling the windings of the first relay through the terminal to a first ground connection includes a line relay responsive to seize signals to provide a partial coupling aof a relaynd a hold relay operated by the line relay to complete the coupling.

4. A circuit as claimed in claim 3, in which
the line relay is coupled to respond to dial pulses and thereby alternately energize and release the first relay by completing and breaking connections between the source of potential and ground.

5. A circuit as claimed in claim 1, in which
said switching means for coupling said first relay to a first ground connection includes contacts of a line relay and of a hold relay which couple the windings of the second relay between the first and the second ground connections.

6. A circuit as claimed in claim 3, in which
the line relay is coupled to respond to dial pulses and thereby to alternately close and open its contacts, said line relay operating when its contacts are open to disconnect the first ground connection and to apply the potential across the windings of the second relay, thereby causing a collapse in the magnetic field of the first relay and inducing a high voltage in the windings of the second relay.

* * * * *